(12) United States Patent
O'Toole, Jr. et al.

(10) Patent No.: US 7,660,901 B1
(45) Date of Patent: Feb. 9, 2010

(54) METHOD AND APPARATUS FOR DEFINING A USER SPECIFIC CONFIGURATION ENVIRONMENT

(75) Inventors: James W. O'Toole, Jr., Somerville, MA (US); Gang Lu Lu, Sterling, MA (US)

(73) Assignee: Cisco Technology, Inc., San Jose, CA (US)

( * ) Notice: Subject to any disclaimer, the term of this patent is extended or adjusted under 35 U.S.C. 154(b) by 12 days.

(21) Appl. No.: 11/821,181

(22) Filed: Jun. 22, 2007

Related U.S. Application Data

(63) Continuation of application No. 10/357,625, filed on Feb. 4, 2003, now abandoned.

(51) Int. Cl.
G06F 15/177 (2006.01)

(52) U.S. Cl. ............... 709/228; 709/220; 709/221; 709/222; 709/227; 715/745; 715/744

(58) Field of Classification Search ......... 709/220–222, 709/228, 227, 246; 715/745, 744
See application file for complete search history.

(56) References Cited

U.S. PATENT DOCUMENTS

| | | | |
|---|---|---|---|
| 5,195,130 A | 3/1993 | Weiss et al. ............... 379/98 |
| 5,874,954 A | 2/1999 | Kilmer et al. ............... 345/333 |
| 6,023,762 A | 2/2000 | Dean et al. ............... 713/193 |
| 6,078,326 A | 6/2000 | Kilmer et al. ............... 345/333 |
| 6,119,157 A | 9/2000 | Traversat et al. ............... 709/220 |
| 6,199,099 B1 | 3/2001 | Gershman et al. ............... 709/203 |
| 6,301,666 B1 | 10/2001 | Rive ............... 713/200 |
| 6,341,316 B1 | 1/2002 | Kloba et al. ............... 709/248 |
| 6,356,437 B1 | 3/2002 | Mitchell et al. ............... 361/683 |
| 6,421,717 B1 | 7/2002 | Kloba et al. ............... 709/219 |
| 6,442,690 B1 | 8/2002 | Howard, Jr. et al. ............... 713/175 |
| 6,460,084 B1 * | 10/2002 | Van Horne et al. ............... 709/227 |
| 6,519,571 B1 | 2/2003 | Guheen et al. ............... 705/14 |
| 6,697,806 B1 * | 2/2004 | Cook ............... 707/10 |
| 6,836,805 B1 * | 12/2004 | Cook ............... 709/245 |
| 6,993,554 B2 | 1/2006 | O'Donnell ............... 709/202 |
| 7,111,052 B1 * | 9/2006 | Cook ............... 709/219 |
| 7,136,909 B2 | 11/2006 | Balasuriya ............... 709/220 |
| 2004/0003060 A1 | 1/2004 | Asoh et al. ............... 709/220 |
| 2004/0139170 A1 * | 7/2004 | Shen et al. ............... 709/227 |

* cited by examiner

Primary Examiner—Kenneth R Coulter
(74) Attorney, Agent, or Firm—BainwoodHuang

(57) ABSTRACT

A method for identifying an expected configuration environment defined by configuration parameters typically employed by a user, and seamlessly applying the configuration environment to subsequent network transaction requests of the user, regardless of the network access point from which the transaction request emanates, provides remote network access according to the expectations of the user. Each user has an independent configuration environment stored in a memory accessible by a data communications device. The data communications device identifies a connection as emanating from a particular user, and applies the corresponding configuration environment from the memory to network transaction requests from the user. In this manner, the user perceives the same treatment by the network when connecting in the home office as well as via a remote connection such as from a hotel, airport, or cybercafe. Accordingly, attempts to access the network from a remote network access point will not impede the user because the expectations of the user about the network will be unchanged from the home office network access point.

30 Claims, 6 Drawing Sheets

METHOD AND APPARATUS FOR DEFINING A USER SPECIFIC CONFIGURATION ENVIRONMENT

CROSS REFERENCE TO RELATED APPLICATIONS

This Patent Application is a continuation of U.S. patent application Ser. No. 10/357,625 filed on Feb. 4, 2003, now abandoned, entitled, METHOD AND APPARATUS FOR DEFINING A USER SPECIFIC CONFIGURATION ENVIRONMENT, the contents and teachings of which are hereby incorporated by reference in their entirety.

BACKGROUND

Conventional data communication networks employ a variety of communication protocols according to a known layered architecture and the type of data exchanged. In general, the communication protocols are adaptable to a broad range of users by allowing each user to specify certain configuration parameters. The protocols typically operate according to a set of configuration parameters based on certain assumptions and known values, such as the location of a network access point of a user. The configuration parameters correspond to the type of network transaction requests of the user, the computing device of the user and physical aspects of the communications network at the user's network access point.

The computing device of the user typically stores the configuration parameters locally and applies the parameters when the user initiates a connection request to the network. The configuration parameters specify optimal values for access to the network at the network access point. In a TCP/IP (Transmission Control Protocol/Internet Protocol) network, for example, such values include the IP address of the user, the network mask, the default router address, a DNS (Domain Name Service) server address, a WINS (Windows Internet Name Service) server and others depending on the type of network transaction and the protocol.

Frequently, a user will tend to employ the same network access point, or one of several similar network access points, such as a wired office connection to a laptop, desktop PC or a bank of co-located PCs in a common office area. Accordingly, the configuration parameters of the user's computing device operate to provide the user with acceptable network access due to the known characteristics of the network at the network access point. The PC or laptop applies the configuration parameters from a local data store on the PC or laptop, therefore assuming the network characteristics of the network access point. Alternatively, the local computing device invokes a common set of location specific configuration parameters for multiple users, as in the case of a common PC bank of a group of users. The above approach provides consistent connectivity from a known location by retrieving a set of stored configuration parameters to provide efficient, repetitive connections to the communications network from the known network access point.

Periodically, a user wishes to attempt to connect to the network from an infrequently used or atypical, remote location. Some conventional devices provide selective network access to users from a remote location for occasional use. One conventional device authenticates users via a credit card or other payment means and affords access to a routing engine that opens up filters to the Internet for the duration of the timing window. This device maps a user address to an available address, and derives the user address and other configuration parameters from the computing device. A device which operates in a manner similar to that described above is a data communications device running the Building Broadband Service Manager (BBSM) application, which is marketed commercially by Cisco Systems, Inc, of San Jose, Calif., assignee of the present application, and which provides multiplexed access to users via a fee-for-services timing window.

Another conventional device determines a user identity that specifies the physical location of the user, and selectively supplies the user with a redirected page (file) for display in a Graphical User Interface (GUI). In this manner, the device determines a disconnected state of a user, and, upon reconnection, sends a forced portal redirection page for display to direct the web navigation of the user to the selected portal page. A data communications device which operates in a similar manner is described in U.S. Pat. No. 6,460,084, filed Apr. 9, 1999, entitled "Forced Network Portal," also assigned to Cisco Systems, Inc., the teachings of which are hereby incorporated by reference in their entirety.

BRIEF DESCRIPTION OF THE DRAWINGS

Certain objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

Unfortunately, there are deficiencies with the above described scenarios for network access via dynamic or infrequent network access points. For example, often a user may be offsite from the home office and attempt to connect to the network via such a dynamic remote network access point. Such a user will tend to employ the same set of configuration parameters as if they were attempting to connect via the network access point in the home office. However, the configuration parameters that are optimal for network access from the home office may not lend themselves well to access from the remote network access point. Accordingly, the user may find that the performance from the remote network access point is substantially degraded or even inoperable.

The present disclosure is directed to techniques for identifying an expected configuration environment defined by configuration parameters typically employed by a user, and seamlessly applying the configuration environment to subsequent network transaction requests of the user regardless of the network access point from which the network transaction request emanates. Each user has an independent configuration environment stored in a memory accessible by a data communications device. The data communications device identifies a connection as emanating from a particular user, and applies the corresponding configuration environment from the memory to network transaction requests from the user. In this manner, the user perceives the same treatment by the network when connecting from the home office as well as via a remote connection such as from a hotel, airport, or cybercafe. Accordingly, the user will not be frustrated or impeded by attempts to access the network, configure and send from a remote network access point when away from the home office network access point.

The configuration parameters collectively define the configuration environment for each user of a plurality of users. The data communications device invokes the memory for storing the configuration environments corresponding to each user, and maintains and updates the configuration environment by examining network transaction requests emanating from each user and identifying transaction characteristics of the requests. The network transaction requests build and augment the current configuration environment for each user, thereby enabling the data communications device to learn the changes and additions to the configuration environment of each user. The data communications device correlates the network communications requests with the configuration environment of the user to maintain and apply the preferences of the user based on the learned patterns and preferences from previous requests.

DESCRIPTION OF EXAMPLE EMBODIMENTS

Figure 1:
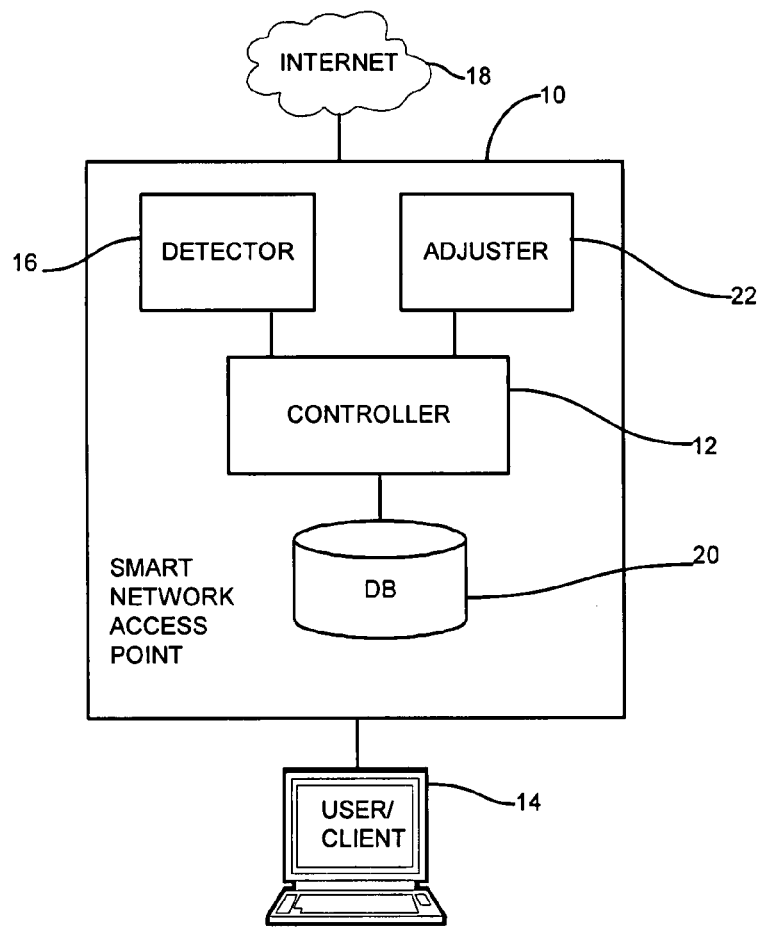
FIG. 1 is a block diagram of a communications system which is suitable for use by the invention.

FIG. 1 shows a communications system which is suitable for use by the invention. Referring to FIG. 1, the communications system includes a data communications device 10, a user device or client 14 and a network 18. The data communications device 10 includes a detector 16, an adjuster 22, a controller 12 and a database 20. The controller 12 connects with each of the detector 16, the adjuster 22 and the database 20.

As shown in FIG. 1, the data communications device 10 connects the user to the network 18. By way of example only, the network 18 is a composition of other network devices, servers and clients such as the Internet. As will be explained in further detail shortly, the data communications device 10 is configured to operate as a smart and friendly network access point from the perspective of a client user 14. In a particular arrangement, the data communications device implements a multi-port packet switch having multiple downstream user ports and upstream Internet connections.

In general, the detector 16 is configured to read transactions from the user and determine transactional characteristics about the transaction. Additionally, the detector 16 is configured to analyze the transactional characteristics and compute user configuration parameters from the analysis of the transactional characteristics. The detector 16 is responsive to the controller 12, and reads the transactions from the user 14 to determine transactional characteristics about the transaction. The detector 22 computes configuration parameters employed by the user 14 from the transactional characteristics. The controller 12 receives the configuration parameters from the detector 16, and stores them in the database 20. The adjuster 22 is also responsive to the controller 12, and reads the configuration parameters from the database 12 to apply a configuration environment corresponding to the user 14. Therefore, the detector 16 builds a configuration environment corresponding to a particular user 14 by reading the series of network transaction requests (transactions) emanating from the particular user 14 (14n generally) to compute a plurality configuration parameter sets, described further below.

Figure 2:
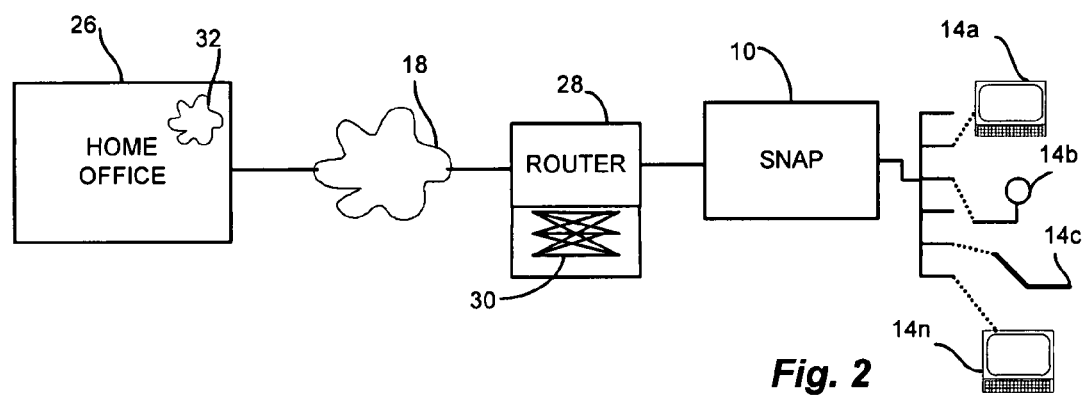
FIG. 2 is a block diagram of a communications network which employs the communications system of FIG. 1.

FIG. 2 is a block diagram of a communications network employing the data communications device 10 of FIG. 1. Referring to FIG. 2, the communications network 24 includes interconnected elements that collectively provide an interconnection to the user 14n for network services. The user 14n connects to the data communications device 10 from a computing device such as a desktop 14a, wireless link 14b, or laptop 14c. The data communications device 10 is a Smart Network Access Point (SNAP) that determines and stores configuration parameters corresponding to the user 14n, described further below.

One or more routers 28 have a switching fabric 30 providing access to the Internet 18. A home office 26 includes a LAN 32 or intranet that the user typically employs. The home office LAN 32 is indicative of the configuration parameter preferences expected by the user 14n, since the user 14n invokes the home office 26 system most frequently. Accordingly, the user 14n has expectations consistent with the configuration environment provided by the home office 26 LAN 32. The SNAP device 10 provides the user 14a-n with the configuration environment similar to that of the home office 32 from a remote location and device. Further, a plurality of SNAP devices 10 may be included in the network and operable to employ the configuration environments stored in the memory. In this manner, a stored configuration environment having predefined, learned configuration parameters is invoked and applied by the SNAP device 10.

Continuing to refer to FIGS. 1 and 2, a user 14n attempts a connection to a remote site (not shown). The remote site may be any node accessible via the Internet 18 and may, but need not be, the home office 26 LAN 32. The home office LAN 32 provided a reference configuration environment that the user employs remotely. The SNAP device 10 provides the reference configuration environment remotely. The user 14n issues a connection request, described further below. The SNAP device 10 identifies the user 14n from the connection request, and performs a lookup in the DB 20 to find a configuration environment for the user 14n. The SNAP device 10 identifies, for each network transaction request, the type of network transaction request. From the type of request, the SNAP device 10 invokes an embedded proxy server, also described further below, corresponding to that type. The embedded proxy server includes a mapping for each known user 14n, and applies the configuration parameters from the configuration environment for this user 14n. If the SNAP 10 device finds no embedded proxy server for the current user 14n, the controller passes the network transaction request to the detector 16. The detector 16 identifies and extracts the configuration parameters 40n in the request, and stores them in the DB 20. The adjuster 22 receives the configuration parameters 40n from the DB for the transaction type. The adjuster 22 then writes a proxy entry in the embedded proxy server for the indicated transaction type, and corresponding to the particular user 14n, so that subsequent transactions of the indicated transaction type for the particular user 14n will be handled by the embedded proxy server, described further below with respect to FIG. 3.

Figure 3:
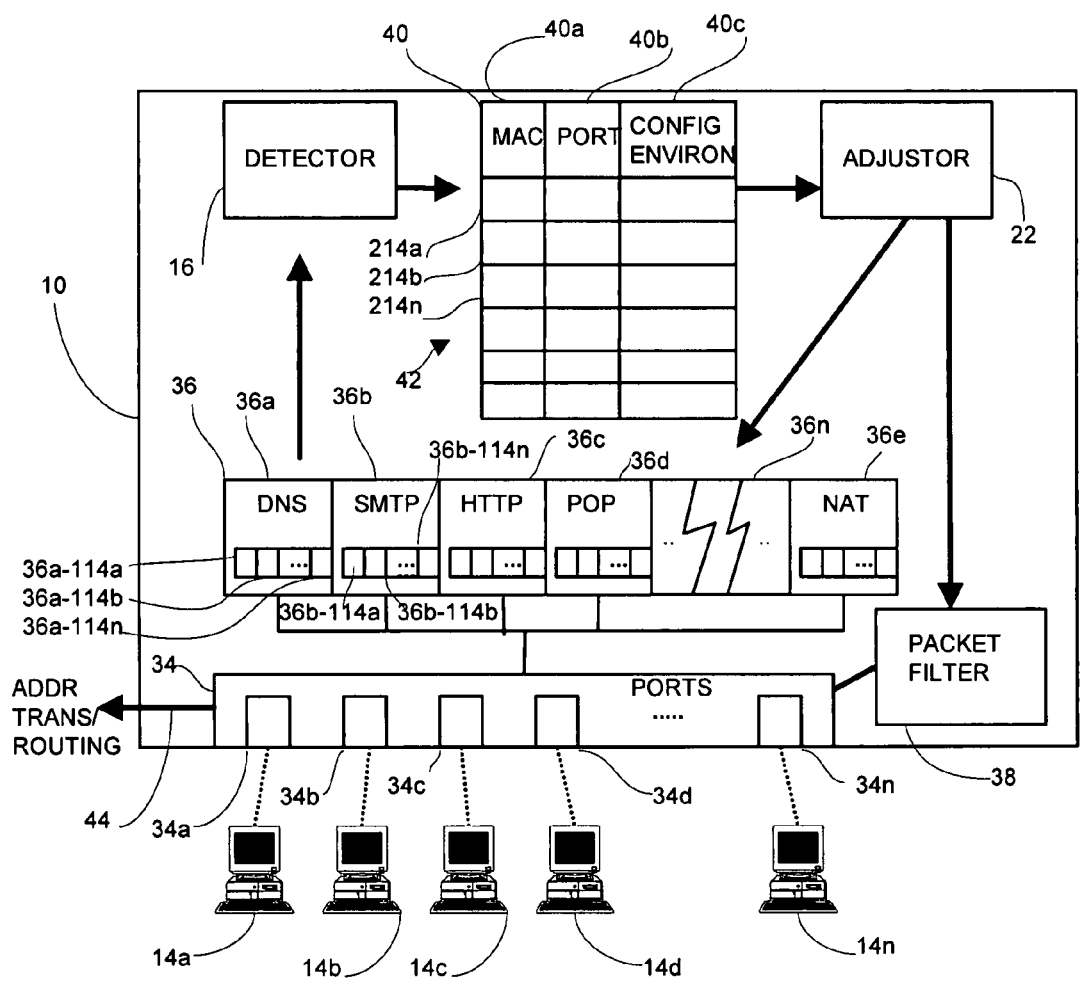
FIG. 3 is a block diagram of a data communications device of the communications system of FIG. 1.

FIG. 3 is a block diagram of the data communications (SNAP) device 10 for providing a user specific configuration environment. Referring to FIG. 3, a plurality of users 14a-14n connect to the SNAP device 10 via a bank 34 of switch ports 34a-34n (34n generally). A user 14n sends a network transaction request packet via the corresponding switch port 34n. An packet filter 38 performs a first-level routing lookup to determine whether the SNAP device 10 should forward the packet. Note that the packet filter 38 differs from the address translation (NAT) embedded proxy server 36e because the packet filter 38 acts as a policy filter based on access control lists and/or configurable policies. If the packet filter 38 finds a lookup match, the SNAP device 10 forwards the packet onto the next node according to the packet filter 38, such as router 28, as shown by arrow 44.

Otherwise, the SNAP device 10 reads the MAC (Media Access Control) address and port No. fields from the packet to identify the particular user, 14a for example. Since the user is identified by MAC address, multiple users may share the same device port 34n on the SNAP device 10. As the users multiplex or interleave their respective packets, the SNAP device 10 would nonetheless apply the configurations based on the MAC address. Therefore, multiple users can connect to the same physical switch port 34n on the SNAP device 10, and the device 10 treats each user as if connected to a unique physical switch port 34n because the SNAP device 10 distinguishes each based on user identification, such as MAC address.

The SNAP device 10 identifies the packet as being of a certain type, such as DNS, SMTP, HTTP, etc. A set 36 of embedded proxy servers 36a-36n (36n generally) each correspond to a respective transaction type. Having identified the transaction type, the device 10 invokes the proxy server 36n corresponding to the transaction type. Each proxy server has an entry 36n-114a to 36n-114n (36n-114n generally) for each known configuration environment 214n. For user 14a, for example, an SMTP transaction request (embedded proxy server 36b) having an entry for user 14a has proxy server entry 36b-114a corresponding to configuration environment 214a entry 214a in the configuration environment table 42. The entries 36n-114n are also referred to herein as mapping and translation values.

The identified proxy server 36n searches for an entry 36n-114n matching the configuration environment of the user 14n. If the proxy server 36 finds an entry 36n-114n, then the proxy server 36n applies the set of configuration parameters 40n included in the user's 14n configuration environment for this type of transaction. If a matching entry is not found, then the configuration parameter set for this transaction type is not yet known in this user's 14a configuration environment.

If a matching entry is not found, then the detector 16 attempts to determine the transaction characteristics to update the configuration parameter set, described below. Further, if a matching entry is found, but is indicative of different configuration parameters 40n, then the adjuster 22 updates the configuration environment to learn the new configuration parameter set. Such an update might occur, for example, if the home office 26 of the user were geographically moved, in which case different server addresses would appear in the network transaction request packets.

If the embedded proxy server 36 does not find an entry 36n-114n, then the embedded proxy server 36n sends the transaction request packet to the detector 16 to create or augment the configuration environment. The detector identifies the user 14n of the message by reading the MAC address and the port identifier of the packet. The detector parses a configuration environment table 40 in the DB 20 for a matching MAC address 40a and port 40b. The configuration environment table 40 has entries 42 corresponding to each known user, 214n generally. If the detector 16 finds a matching MAC address 40a and port 40b, then the user 14n is known and the detector 16 reads the transactional characteristics from the transaction request packet to determine the type of message and the configuration parameter set for this type of transaction. If the detector 16 does not find a matching MAC address 40a and port 40b, then the detector 16 creates a new user configuration entry 214n.

The detector 16 computes, for the current transaction type, a corresponding configuration parameter set from the transactional characteristics. The detector then stores the configuration parameter set in the configuration environment 40c in the corresponding entry 42 in the configuration table 40. The configuration environment table 40 is described in more detail below with respect to FIG. 6.

When the detector 16 updates the configuration environment entry 42, the adjuster 22 generates a corresponding update to the embedded proxy servers 36. The adjuster retrieves the configuration parameter set for the updated configuration environment 214n. The adjuster 22 determines which embedded proxy server 36a-36n to update based on the transaction type. The adjuster then updates the embedded proxy server entry 36n-114n for the affected configuration environment 214n. The embedded proxy server 36n will employ the configuration parameter set of the configuration environment 214n for subsequent network transaction requests for that transaction type.

Figure 4:
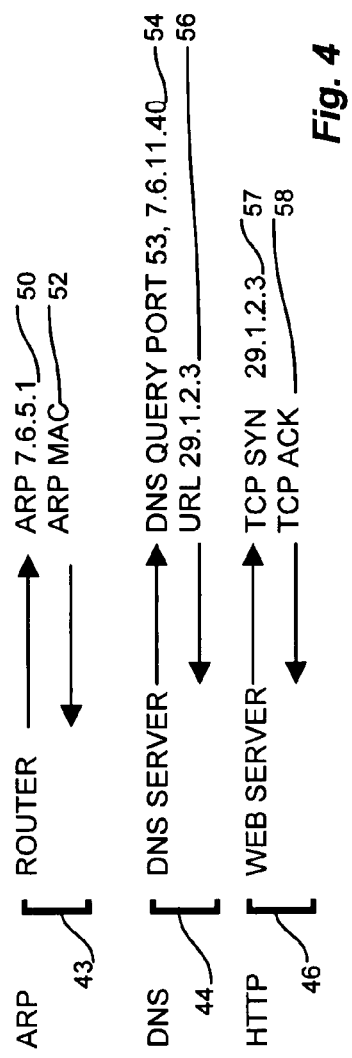
FIG. 4 is a diagram of connection sequences employed in certain typical network protocols which are suitable for use by the communications system of FIG. 1.

FIG. 4 is a diagram of connection sequences employed in a typical user connection, also known as a connection handshaking. Referring to FIG. 4, a user 14n employs network transaction request sequences 43, 44 and 46 that employ the embedded proxy servers described above. A user 14n initiates an ARP (Address Resolution Protocol) request 50 for address 7.6.5.1. The ARP response 52 includes the MAC address corresponding to the user, and is employed by the NAT 36e (FIG. 3) embedded proxy server. Note that NAT functions, being a fundamental router operation, occur in both the NAT embedded proxy server 36e and in the packet filter 38, depending on design. Next, the user 14n attempts to resolve a domain name URL, and issues DNS request 54. The DNS server (not shown) replies with response 56 including the IP address. The user 14n then attempts to connect to the returned IP address, and issues TCP Syn 57 to the web server address 56. A TCP Ack 58 indicates completion. The detector 16 evaluates each of these network transaction requests and generates configuration entries 42 and corresponding proxy server 36n entries for the NAT, DNS, and HTTP proxy servers 36e, 36a and 36c, respectively.

Referring again to FIG. 3, the embedded proxy servers 36n perform transaction specific operations on packets comprising the respective transaction type, as follows. Specifically, in a particular arrangement, the SNAP device 10 performs NAT operations via the NAT proxy server 36e using the tuple <switch port, address, network port> and <external address, network port>. Different switch port values allow conflicting inside IP addresses because the port based tuples distinguish the individual users. A DNS request allows the DNS proxy server 36a to perform recursive DNS lookups and caching of the DNS resolution result. The SMTP (Simple Mail Transfer Protocol) proxy server 36*b* accepts email submissions and transfers the result on behalf of the client without requiring checking the client's real identity. The HTTP proxy server 36*c* allows web transaction results in a URL based file fetch and caching. The POP proxy server 36*d* constructs responses based on the POP protocol, such as "no mail received" and can transact email collection requests to other POP servers. Note that POP deals with the receiving of mail and is not to be confused with SMTP which is a protocol used for transferring email across the Internet. Users send email with SMTP and a mail handler receives it on the recipient's behalf. The user then reads the mail using POP. Other transactions and proxy servers operate similarly.

With respect to layer 2 traffic, the SNAP device 10 detects incoming traffic on a port, unblocks the port, and responds based on the packet type and destination. The controller 12 provisions each port as a separate VLAN (Virtual Local Area Network) based on the configuration environment to distinguish local traffic from traffic on other VLANs. In the case of a DHCP request, the SNAP device 10 responds with a packet including the DHCP lease. The DHCP lease includes information such as the IP address from the DHCP pool, a default embedded router address and default embedded DNS server address. With respect to ARP traffic, the switch responds to an ARP request appearing on a port by emulating an ARP reply using its interface MAC address on the port. If the client has local servers to contact, it will send out ARP requests first. The SNAP device 10 then emulates the local servers, and caches the pair <IP address, MAC address> from the header of the ARP request, and issues an ARP answer as known local addresses of the configured VLAN.

Figure 5:
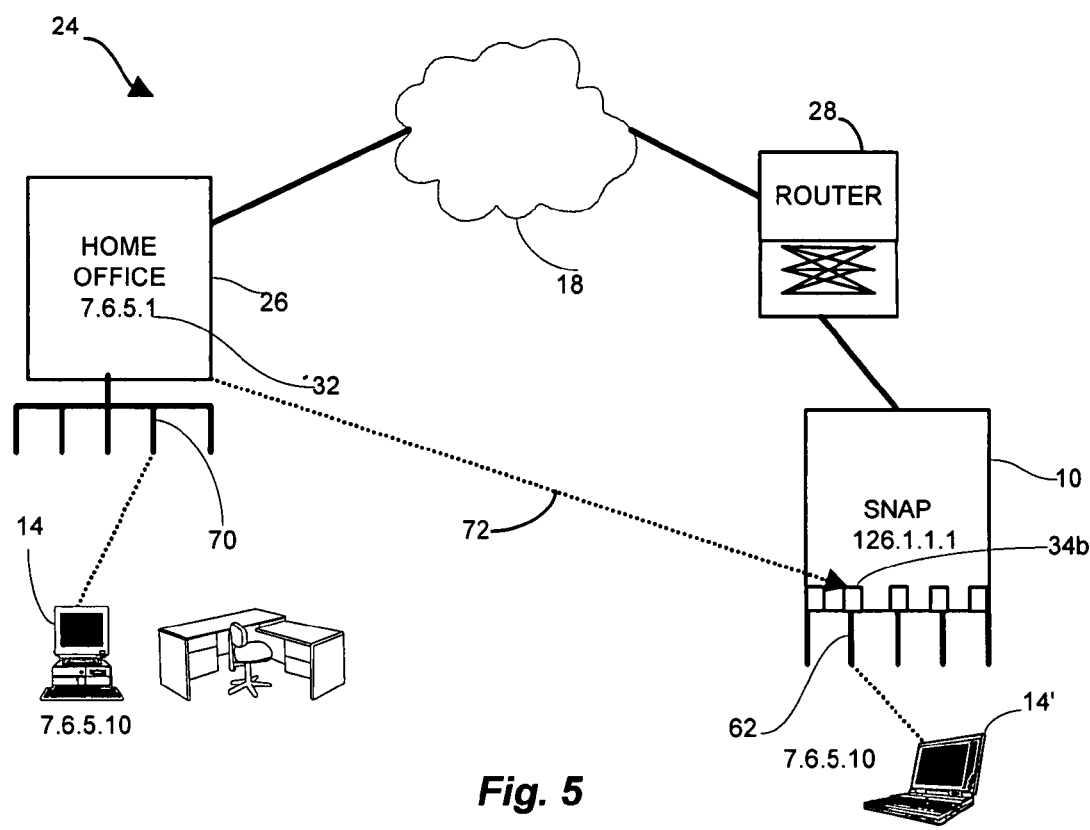
FIG. 5 is a diagram of a user connection to a communications network from a home office and from a remote location which utilizes the communications system of FIG. 1.

FIG. 5 is a diagram of a user connection to the communications network from a home office and a remote location within the communications network 24. Referring to FIG. 5, a user 14 typically connects to the Internet from the home office 26 location at network access point 70. The home office LAN 32 has an IP address of 7.6.5.1, and the user 14 is assigned IP address 7.6.5.10. The user 14' is away from the office 26, and wants to connect from a laptop (note that the designation 14' refers herein to an instantiation of the user 14 at a remote location). The user 14' connects to a switch port 34*b*, shown by network access point 62, on the SNAP device 10, employing the expected configuration environment of the user which includes the IP address of 7.6.5.1 from the typical home office 26 network access point 70. The SNAP device 10 has an actual IP address of 126.1.1.1, however, has access to the configuration environment of the user 14', as shown by arrow 72. The SNAP device 10 recognizes the user 14' and provides the user 14' the expected configuration environment, including access via the address 7.6.5.1, thereby emulating the user's 14' known and expected configuration parameters 40*n* with respect to the rest of the communications network 24. The user 14,' therefore, enjoys access via their known IP address 7.6.5.1, while the SNAP device 10 effects the various network transaction requests via the physical address 126.1.1.1.

Figure 6:
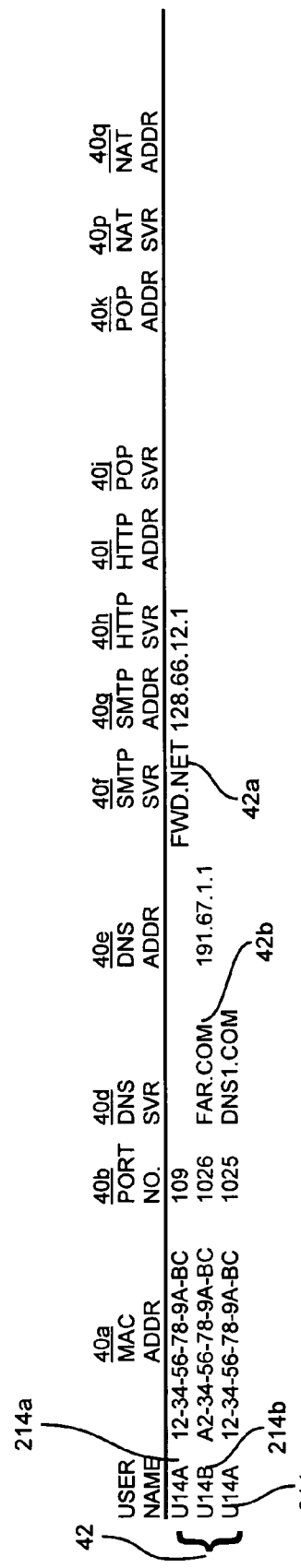
FIG. 6 is a table illustrating exemplary configuration environments of multiple users which utilizes the communications system of FIG. 1.

FIG. 6 is a table illustrating an exemplary configuration environment. Referring to FIG. 6, a plurality of users 14*a*-14*b*, denoted by usernames U14A-U14B respectively, are shown in the configuration environment table 40. As indicated above, the configuration environment is keyed from the MAC address 40*a* or Port No. 40*b*, however in alternate configurations other key fields are employed. Further, both Mac address 40*a* and Port No. 40*b* may be employed to denote configuration parameter sets for different traffic types for a particular user.

Each entry 42 or collection of entries corresponding to a user 14*n* in the configuration environment table 40 denotes a configuration environment 214*a*-214*c*. Accordingly, the same user may have multiple entries 42 corresponding to different traffic types and/or port numbers. Exemplary fields are shown and include DNS (Domain Name Service) server and IP address 40*d*, 40*e*, for resolving domain name URLs, SMTP (Simple Mail Transport Protocol) server and address 40*f*, 40*g* for resolving email transmissions, HTTP (Hypertext Transfer Protocol) server and address 40*h*, 40*i*, indicative of remote nodes (sites) traversed via a browser application, POP server and address 40*j*, 40*k*, and NAT server and address 40*p* and 40*q*, described above. The illustrated fields are intended by way of example only.

As indicated above, the configuration environment for a particular user may be represented by one or more entries 42 collectively defining the known configuration parameters for that user. It should be understood that the configuration environment table 40 shown is exemplary only, as a particular arrangement of associating a particular user and traffic type with the configuration parameter sets, and is capable of employing other fields as well. A configuration environment entry 42 associated with a particular user may be, in alternate configurations, identified by fields other than MAC address and port number. Further, it will be apparent to those skilled in the art that the configuration environment table may employ other representations to associate a user with the configuration parameters for particular traffic types for the particular user. For example, the configuration environment table organization may include multidimensional databases, linked lists, and other forms of dynamic and static storage.

In a particular arrangement, the SNAP device 10 provides a configuration environment operable to configure a virtual network to emulate a user's expected IP address, network mask, default router, DNS server, HTTP web proxy server, POP server, SMTP server, NFS (Network File Sharing) server, and email settings. The SNAP device 10, therefore provides a virtual network to each user so connected such that each user sees their expected configuration environment as emulated by the SNAP device 10, while the SNAP device 10 transacts packets with the remainder of the network 24 on behalf of the user via the embedded proxy servers 36*n*.

Further, as the MAC address 40*a* and port ID 40*b* key the configuration environments, it is possible that a particular user 14*n* may have more than one configuration environment entry, as shown in FIG. 6 with respect to User 1 (214*a*, 214*c*). Since the TCP port No. is indicative of a logical connection to a particular server application, and since certain so-called well known port numbers (RFC 1700) are indicative of a particular traffic content type, a particular user 14*n* may generate multiple configuration environment entries 42 to different applications having different port numbers. Each environment, however, is deterministic of a particular user 14*n*.

Figure 7:
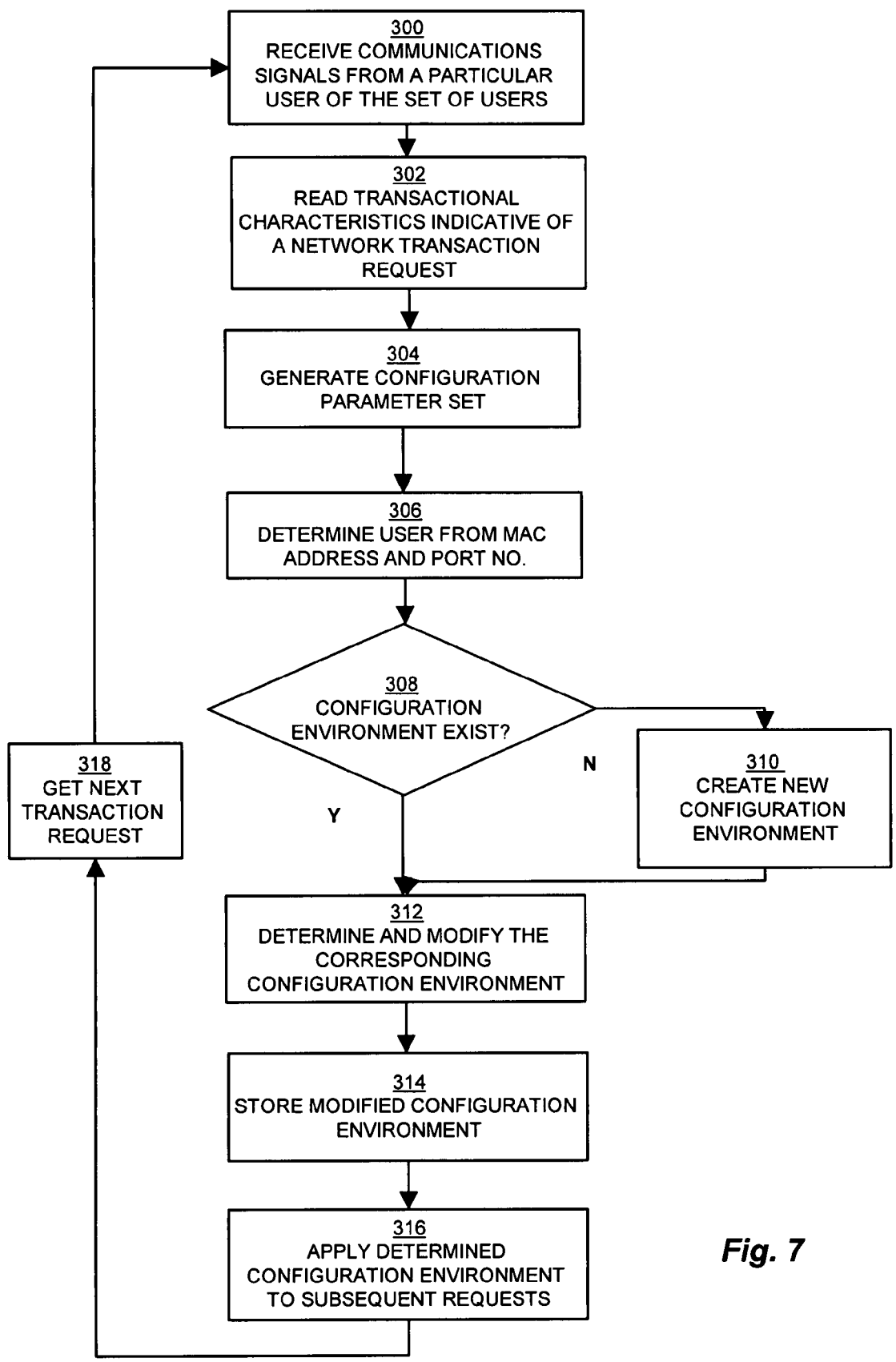
FIG. 7 is a flowchart of a procedure which is performed by the data communications device of FIG. 3 for a network communications employing a user specific configuration environment.

FIG. 7 is a flowchart of network communications employing a user specific configuration environment. Referring to FIGS. 7, 6 and 1, the SNAP device 10 provides network services to a set of users via a computerized device over a communications network. In step 300, the SNAP device 10 receives communications signals from a particular user of the set of users. In step 302, the detector 16 reads transactional characteristics from the communications signals indicative of a network transaction request for a particular type of network transaction. As shown at step 304, the detector 16 generates a configuration parameter set based on the transactional characteristics. Each configuration parameter set corresponds to a particular type of network transaction, and contains the configuration parameters 40*n* extracted, or read from the communication signals, or packet, received. Next, as depicted at step 306, the detector determines the user 14n sending the communication signals by reading the MAC address 40a and switch port No. 40b in the request. In step 308, the detector 16 performs a check to determine if a configuration environment 214n exists corresponding to this user 14n. As shown at step 310, if no configuration environment 214n is found, then the user 14n is a new user and the detector creates a new configuration environment entry 42 in the configuration environment table 40.

In step 312, employing either the new configuration environment 214n or the found existing environment 214n, depending on the check at step 308, the detector 16 determines and modifies the corresponding configuration environment 214n to include the generated configuration parameter sets from the transactional characteristics. In step 314, the detector then stores the modified configuration environment entry 42 in the database 20. Once stored, as depicted at step 316, the adjuster 22 applies the determined configuration environment 214n to subsequent network transaction requests from the user 14n by employing the configuration parameter set corresponding to the requested transaction type. In step 318, the SNAP device 10 then waits for the next transaction request packet on the port. Since the configuration environment 214n is keyed off the MAC address and port No, the SNAP device 10 applies the configuration environment 214n independently of the configuration environment 214n corresponding to other users 14n of the set of users.

Figure 8:
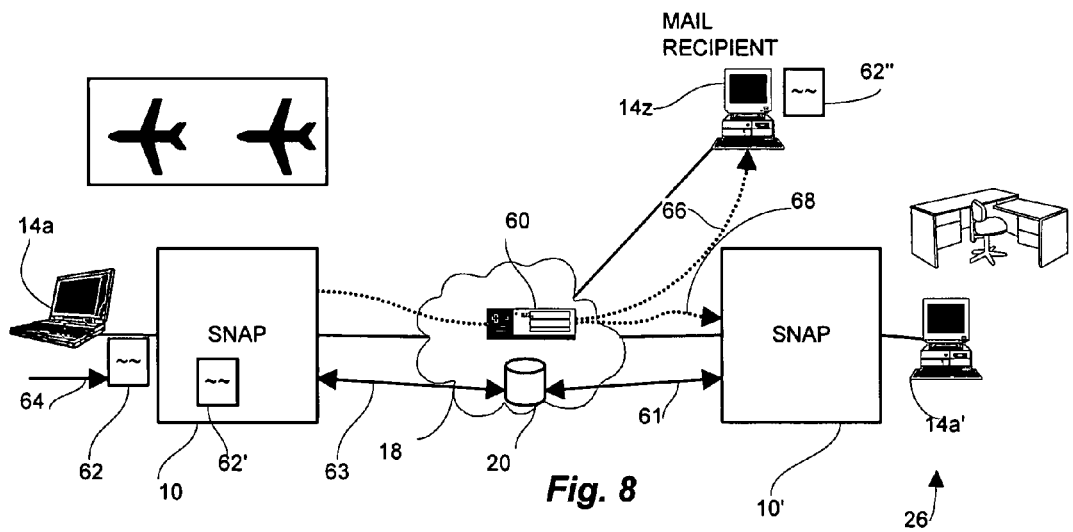
FIG. 8 shows an example of the user specific configuration environment employed by the data communications device of FIG. 3 to send an email from a remote location.

FIG. 8 shows an example of the user specific configuration environment employed by the data communications device to send an email from a remote location. Referring to FIGS. 8 and 6, suppose that a user 14a desires to send an email to a user colleague 14z while on a business trip. Further suppose that the user 14a is located in an airport, and has only minutes to make a departure. However, the mail file is rather large, about 5 meg., and will take about 10 minutes to transmit to the user 14z, even without any interim server discontinuity.

The user 14a, however, is connected to the SNAP device 10 at the airport. The SNAP device 10 is in communication with the database 20 that stores the configuration environment 40. The database 20 maintains the configuration environment 40 from updates received from the SNAP device 10' near the home office 36, as shown by arrow 61. The SNAP device 10 knows the SMTP server address 42a of the SMTP server 60, from the configuration environment 214a in the database 20, as shown by arrows 63, 61. The user 14a issues a network transaction request to send the email 62, shown by arrow 64. To ensure acknowledgment, the user 14a requests a return receipt. The connection between the user 14a and the SNAP device 10 is a fast local connection and the SNAP device receives the 5 meg. mail file 62' in a manner of seconds. From the perspective of the user 14a, the email send 64 is complete and the user 14a shuts down and boards their plane.

Meanwhile, the SNAP device 10 emulates the user 14a and buffers the email 62' while transmitting to the SMTP server 60 at the slower rate expected by the receiving user 14z. As the user travels back to the home office 26, the SMTP server completes the transmission of the email 62" to the user 14z on the behalf of the user 14a. An email ACK or NAK and error message are returned to the SMTP server 60 on behalf of the user, as shown by arrow 66. The SMTP server forwards the message to the SNAP device 10' at the home office. Upon returning to the home office 26, the user 14a' connects to the network 18 via the SNAP device 10,' and receives the ACK or NAK pertaining to the email result.

Figure 9:
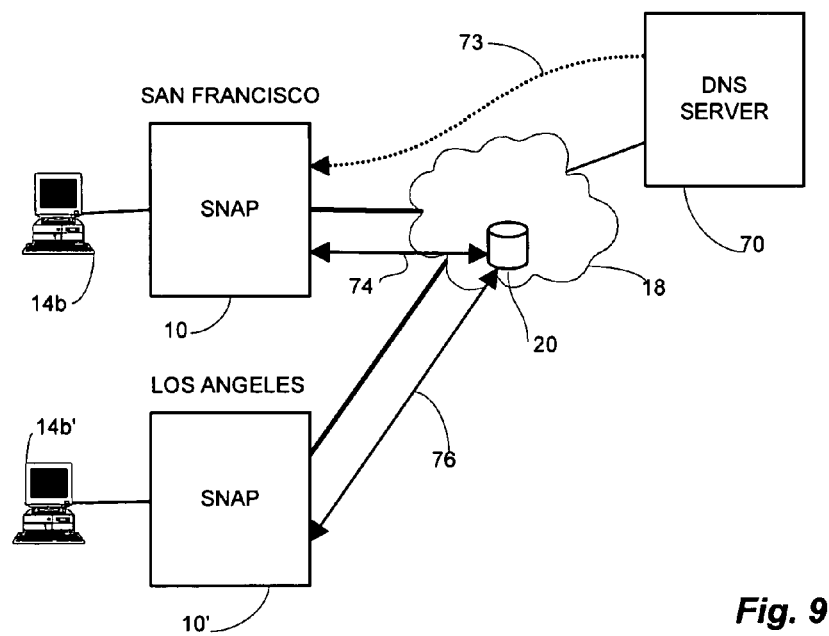
FIG. 9 shows an example of the user specific configuration environment employed by the data communications device of FIG. 3 to resolve a web browser DNS request from a remote location.

FIG. 9 shows another example comprising a web browser DNS resolution request from a remote location. Referring to FIGS. 9 and 6, the user 14b is located in San Francisco, and connected to the SNAP device 10. User 14b issues a browsing request to far.com, triggering a DNS address resolution request to a DNS server 70, located in New York. The DNS server 70 returns the request to the SNAP device 10 as shown by arrow 73. The SNAP device 10 updates the configuration environment 214b of the user, and updates the configuration environment entry 214b including the DNS resolution entry "far.com" 42b, shown by arrow 74.

The user 14b subsequently travels to Los Angeles, and connects to another SNAP device 10.' The user 14b issues another request for the far.com resolution. However, the far.com entry 42b is already in the user 14b's configuration environment 214b. Accordingly, the database 20 provides the address resolution 42b to SNAP device 10' as shown by arrow 76. Alternatively, the address resolution for far.com 42b is already in the database 20 prior to the DNS request from San Francisco because the DNS request 73 to New York has already occurred from a prior transaction.

As illustrated by the above examples, and FIG. 1, the SNAP device 10 accesses database 20 that stores the configuration environment 42 via several methods. In a particular arrangement, the database 20 is stored in a memory within the SNAP device 10. In another particular arrangement, the database 20 is common to several SNAP devices 10 within a LAN or other local proximity arrangement. In other arrangements, an external device stores the database 20 (e.g., at a remote location accessible by a plurality of SNAP devices 10 via the Internet 18), and distributes the data base 20 for faster access. The database 20 employs a common storage repository in such arrangements, perhaps via an LDAP directory or other shared remote access mechanism. Further, there may be a combination of local and remote storage, such as a local RAM or other volatile or non volatile (EPROM) storage of the configuration environment coupled with periodic or event driven mirroring of a more global repository.

The database storage alternative arrangements described above are coupled with a database initialization mechanism for deployment of new SNAP devices 10. The database initialization mechanism may initially refresh a new SNAP device 10 with known configuration environments from a central repository. Alternatively, a user displays the SNAP device 10 is deployed in a null state and learns the configuration environments of the users 14n from the successive network transaction requests. Further, there may be an initial set of known configuration environments 214n followed by learning of additional users 14n as encountered via network throughput.

The SNAP device 10 in particular configurations, either initializes to a default value or learns the values from a series of transactions. As described above, the detector 16 will extract the transaction characteristics and compute configuration parameters 40n. If the detector 16 finds an existing configuration environment entry 42 for a user 14n, them the configuration parameters 40n are added to the existing configuration environments 42. If there is not an existing configuration environment, the detector 16 creates configuration environment entry 42. Further, the detector will receive and augment existing configuration parameters 40n with newer configuration parameters 40n computed from more recent transaction characteristics. The detector 16 will augment the configuration environment by superseding existing configuration parameters 40n, or by aggregating trends in the determined configuration parameters 40n to modify existing parameters after a series of different preferences are observed. In this manner, the detector 16 will not trigger a change to the environment by a one-time or short term change in user pattern of the user.

In another particular configuration, a user connects a wireless access device (FIG. 2, 14b) to one of the switch ports on the SNAP device to allow wireless access from a computing device. The wireless access device may be a wireless router, wireless point to point interface, or cell phone interface. Further, the wireless device optionally provides multiplexing to allow several logical connections to communicate via the physical switch port 34n.

Those skilled in the art should readily appreciate that the programs defining a user specific configuration environment as defined herein are deliverable to a processing device in many forms, including but not limited to a) information permanently stored on non-writeable storage media such as ROM devices, or b) information alterably stored on writeable storage media such as floppy disks, magnetic tapes, CDs, RAM devices, and other magnetic and optical media. Alternatively, the operations and methods may be embodied in whole or in part using hardware components, such as Application Specific Integrated Circuits (ASICs), state machines, controllers or other hardware components or devices, or a combination of hardware, software, and firmware components.

While the system and method for defining a user specific configuration environment has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A network device, comprising a collection of hardware components or a combination of hardware, software and firmware components which embody a detector module, an adjuster module and a controller, wherein:
    the detector module is operative to obtain first network configuration parameters from initial client data packets sent to the network device by a client, the first network configuration parameters identifying first servers having corresponding network communications functions in a first network in which the client has operated;
    the adjuster module is operative to create mapping and translation values associating the first network configuration parameters with second servers having the corresponding network communications functions in a second network in which the network device operates; and
    the controller is operative to utilize the mapping and translation values to translate between subsequent client data packets and corresponding translated data packets exchanged between the controller and the second servers such that the client is enabled to operate in the second network using the first configuration parameters;
    wherein:
    the client is one user of a set of users;
    the mapping and translation values are part of a configuration environment corresponding to each of the users, the configuration environment indicative of a configuration parameter set corresponding to each of the users; and
    the controller is further operable to:
        (i) receive communications signals from a particular user of the set of users, the communications signals having transactional characteristics indicative of a request for a particular type of network transaction;
        (ii) determine, from the transactional characteristics, a configuration environment having configuration parameter sets, each configuration parameter set corresponding to a particular type of network transaction; and
        (iii) apply the determined configuration environment to subsequent network transaction requests from the user by employing the configuration parameter set corresponding to the requested transaction type, the configuration environment adapted to be applied by the controller independently of the configuration environment corresponding to other users of the set of users.

2. A network device according to claim 1 wherein the controller is operative to maintain a plurality of proxy servers operable to engage in exchanges with respective ones of the second servers on behalf of the client utilizing the mapping and translation values.

3. A network device according to claim 2 wherein the proxy servers include a Domain Name Service (DNS) proxy server, a Hypertext Transfer Protocol (HTTP) proxy server, a Simple Mail Transfer Protocol (SMTP) proxy server, and a Post Office Protocol (POP) proxy server.

4. A network device according to claim 1 wherein the controller is further operable to maintain a configuration environment of the user in a remote location by accessing a database that receives configuration updates from a device near a home office of the client that is directly aware of a reference configuration environment of the client.

5. A network device according to claim 1 wherein the initial client data packets include an address resolution protocol (ARP) packet including a network-layer address of a server in the first network, and wherein the network device is operable to respond to the ARP packet with a media-access (MAC) layer address of the network device in the second network.

6. A network device according to claim 1 wherein the client is identified by the network device using a client identifier including a media-access (MAC) layer address of the client and an identifier of a port of the network device to which the client is attached, and wherein the mapping and translation values are indexed according to the client identifier.

7. A network device according to claim 1 wherein the first network configuration parameters include first client network address parameters identifying the client in the first network but not in the second network.

8. A network device according to claim 7 wherein the first client network address parameters include an Internet Protocol (IP) addresses, a network mask, and a network address of a default router.

9. A network device according to claim 1 wherein the controller is further operable to determine the configuration environment by learning each of the configuration parameter sets from a set of network transaction requests sent from the user.

10. A network device according to claim 1 wherein the configuration environment is associated with a respective corresponding user via a unique mapping identifier, the unique mapping identifier independent of a node address of the particular user.

11. A network device according to claim 1 wherein the controller is further operable to store each configuration environment such that the configuration environment is employed in executing subsequent network transaction requests of subsequent sessions.

12. A network device according to claim 11 wherein the controller is further operable to selectively retrieve configuration sets of a configuration environment corresponding to a particular user in response to subsequent network transaction requests.

13. A network device according to claim 11 wherein the controller is further operable to modify the configuration environment when the received transaction characteristics of subsequent network transaction requests are indicative of a different configuration parameter set.

14. A network device according to claim 1 wherein the configuration environment further defines a state indicative of a current user profile, and wherein the controller is further operable to apply subsequent transaction requests to determine a subsequent user profile state.

15. A network device according to claim 1 wherein the controller is further operable to apply the configuration environment by selecting at least a portion of configuration parameters from the corresponding configuration parameter set.

16. A method of operating a network device which includes a collection of hardware components or a combination of hardware, software and firmware components, the network device having a client port for connection to a communications link to a client and having a network port for connection to a second network in which the network device operates, comprising:
    obtaining first network configuration parameters from initial client data packets sent to the network device by a client via the client port, the first network configuration parameters identifying first servers having corresponding network communications functions in a first network in which the client has operated, the first network parameters not identifying second servers having the corresponding network communications functions in the second network;
    creating mapping and translation values associating the first network configuration parameters with second servers having the corresponding network communications functions in the second network; and
    utilizing the mapping and translation values to translate between subsequent client data packets and corresponding translated data packets exchanged between the network device and the second servers such that the client is enabled to operate in the second network using the first configuration parameters;
    wherein the client is one user of a set of users, and the mapping and translation values are part of a configuration environment corresponding to each of the users, the configuration environment being indicative of a configuration parameter set corresponding to each of the users;
    and further comprising:
    (i) receiving communications signals from a particular user of the set of users, the communications signals having transactional characteristics indicative of a request for a particular type of network transaction;
    (ii) determining, from the transactional characteristics, a configuration environment having configuration parameter sets, each configuration parameter set corresponding to a particular type of network transaction; and
    (iii) applying the determined configuration environment to subsequent network transaction requests from the user by employing the configuration parameter set corresponding to the requested transaction type, the configuration environment adapted to be applied by the controller independently of the configuration environment corresponding to other users of the set of users.

17. A method according to claim 16 further comprising maintaining a plurality of proxy servers operable to engage in exchanges with respective ones of the second servers on behalf of the client utilizing the mapping and translation values.

18. A method according to claim 17 wherein the proxy servers include a Domain Name Service (DNS) proxy server, a Hypertext Transfer Protocol (HTTP) proxy server, a Simple Mail Transfer Protocol (SMTP) proxy server, and a Post Office Protocol (POP) proxy server.

19. A method according to claim 16 further comprising maintaining a configuration environment of the user in a remote location by accessing a database that receives configuration updates from a device near a home office of the client that is directly aware of a reference configuration environment of the client.

20. A method according to claim 16 wherein the initial client data packets include an address resolution protocol (ARP) packet including a network-layer address of a server in the first network, and wherein the network device is operable to respond to the ARP packet with a media-access (MAC) layer address of the network device in the second network.

21. A method according to claim 16 wherein the client is identified by the network device using a client identifier including a media-access (MAC) layer address of the client and an identifier of a port of the network device to which the client is attached, and wherein the mapping and translation values are indexed according to the client identifier.

22. A method according to claim 16 wherein the first network configuration parameters include first client network address parameters identifying the client in the first network but not in the second network.

23. A method according to claim 22 wherein the first client network address parameters include an Internet Protocol (IP) addresses, a network mask, and a network address of a default router.

24. A method according to claim 16 further comprising determining the configuration environment by learning each of the configuration parameter sets from a set of network transaction requests sent from the user.

25. A method according to claim 16 wherein the configuration environment is associated with a respective corresponding user via a unique mapping identifier, the unique mapping identifier independent of a node address of the particular user.

26. A method according to claim 16 wherein the controller is further operable to store each configuration environment such that the configuration environment is employed in executing subsequent network transaction requests of subsequent sessions.

27. A method according to claim 26 further comprising selectively retrieving configuration sets of a configuration environment corresponding to a particular user in response to subsequent network transaction requests.

28. A method according to claim 26 further comprising modifying the configuration environment when the received transaction characteristics of subsequent network transaction requests are indicative of a different configuration parameter set.

29. A method according to claim 16 wherein the configuration environment further defines a state indicative of a current user profile, and further comprising applying subsequent transaction requests to determine a subsequent user profile state.

30. A method according to claim 16 wherein the controller is further operable to apply the configuration environment by selecting at least a portion of configuration parameters from the corresponding configuration parameter set.

* * * * *

UNITED STATES PATENT AND TRADEMARK OFFICE
CERTIFICATE OF CORRECTION

| | | |
|---|---|---|
| PATENT NO. | : 7,660,901 B1 | Page 1 of 1 |
| APPLICATION NO. | : 11/821181 | |
| DATED | : February 9, 2010 | |
| INVENTOR(S) | : James W. O'Toole, Jr. and Gang Lu | |

It is certified that error appears in the above-identified patent and that said Letters Patent is hereby corrected as shown below:

On the Title page, Item (75)
"Inventors: James W. O'Toole, Jr., Somerville, MA (US); Gang Lu Lu, Sterling, MA (US)" should read --Inventors: James W. O'Toole, Jr., Somerville, MA (US); Gang Lu, Sterling, MA (US)--.

Signed and Sealed this

Seventeenth Day of May, 2011

David J. Kappos
*Director of the United States Patent and Trademark Office*